ST. J. RAVENEL.
Improvement in Apparatus for Making Sulphuric Acid.
No. 114,042. Patented April 25, 1871.
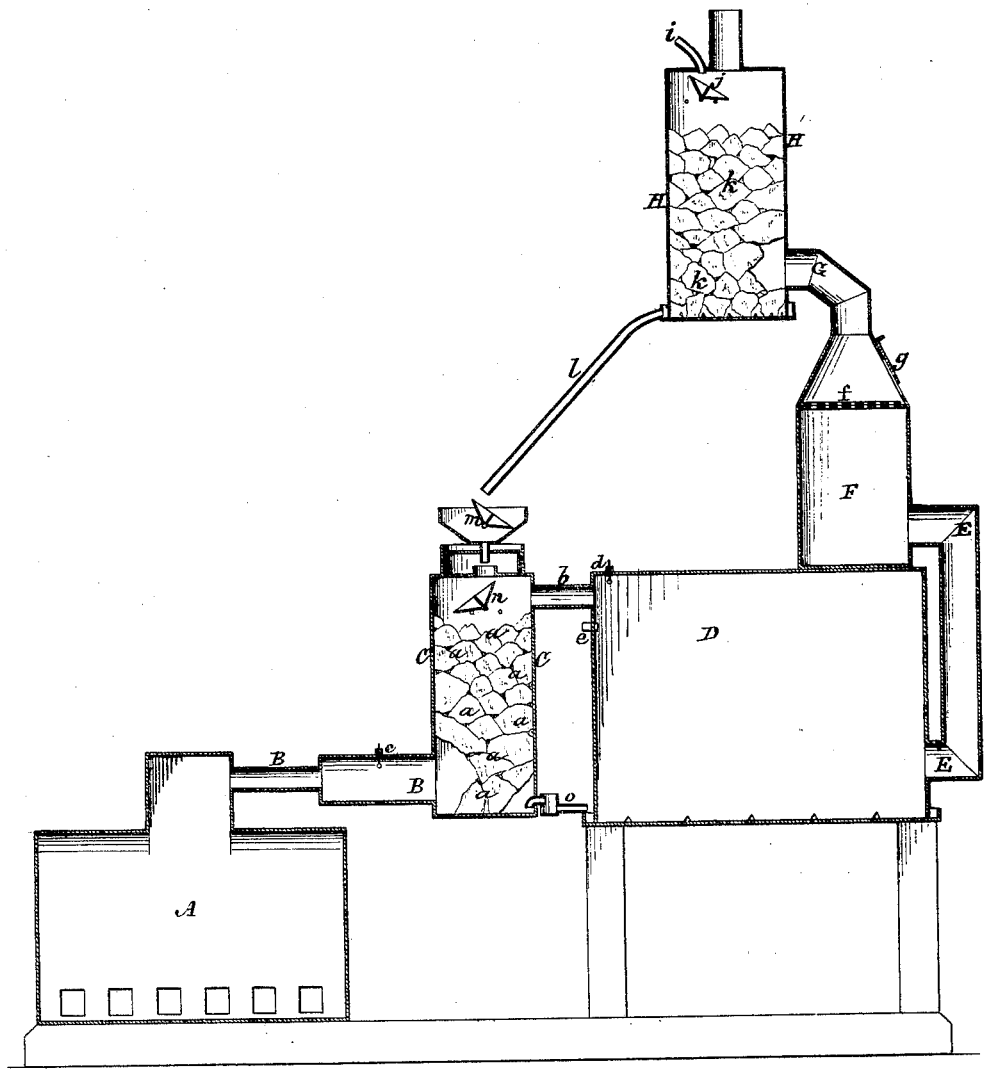
Witnesses.
W. C. Henderson
Edmund Masson
St Julien Ravenel.
By Atty A. B. Stoughton

UNITED STATES PATENT OFFICE.

ST. JULIEN RAVENEL, OF CHARLESTON, SOUTH CAROLINA.

IMPROVEMENT IN APPARATUS FOR MAKING SULPHURIC ACID.

Specification forming part of Letters Patent No. 114,042, dated April 25, 1871.

*To all whom it may concern:*

Be it known that I, ST. JULIEN RAVENEL, of Charleston, in the county of Charleston and State of South Carolina, have made certain new and useful Improvements in Apparatus for Making Sulphuric Acid; and I do hereby declare the following to be a full, clear, and exact description of the same, reference being had to the accompanying drawing, making a part of this specification, and which represents a longitudinal vertical section taken through an apparatus constructed after my general plan.

To enable others skilled in the art to make and use my invention, I will proceed to describe the same in connection with the drawing, and in the order of procedure, as nearly as possible, as it takes place.

I. Sulphur (or substance containing it) is burned with nitrate of soda in a furnace, as at A, to produce sulphurous and nitrous acid gases. These gases, with atmospheric air, which passes through A, are conducted through the pipe or passage B into an evaporating and cooling tower, C. The combustion of the sulphur in the furnace A raises the temperature of the gases to about 450° Fahrenheit. This heat is not only injurious to the lead of which the chambers are made, but is also too high high to allow condensation to take place. To obviate these inconveniences the evaporating and cooling tower C is introduced. It is a leaden vessel, square or round, and its dimensions for a chamber of about one hundred thousand cubic feet capacity should be about six feet across and about ten feet in height. This tower is filled with fire-brick, pumice, or other substance, $a$, such as will resist the action of acid, and which must be kept moistened with weak acid or water. Into the lower part of the tower thus filled the gases from the furnace are introduced through the pipe or passage B, as above mentioned. The hot gases pass through the wet brick or pumice, and are thence conducted to the chamber or antichamber D through a pipe or passage, $b$.

A thermometer placed in the pipe B, as at $c$, will indicate a temperature of about 450° Fahrenheit, while another placed at $d$ or in the pipe $b$ will stand at 212° Fahrenheit, showing that the tower C has the effect of reducing the temperature over 200° Fahrenheit. The principal advantages resulting from this reduction of temperature are hereinafter specified; but it should be here mentioned that the heat thus abstracted is not thrown away, but utilized in converting the water with which the substance $a$ is moistened into steam, which passes over with the gases into the chamber D, where condensation takes place and the sulphuric acid is deposited.

If the whole amount of steam required in the chamber D is greater than can be made in the tower C, more can be admitted from a generator through the pipe $e$.

II. Some of the gases in the chamber D may not be condensed into acid, and to secure their condensation there is needed a fresh supply of atmospheric air. For this purpose these gases are conducted from near the bottom of the chamber D through a pipe, E, into a small leaden vessel, F. This vessel has a perforated diaphragm, $f$, across its interior, which operates such a diminution of the velocity of the draft from the chamber as to render possible the introduction above it of a stream of atmospheric air through an opening in the side of the vessel, shielded and regulated by a slide or door, $g$. It is obvious, moreover, that this diaphragm enables me to regulate the draft of the furnace by the use of small leaden disks to cover its perforations, and which may be shifted at will or altogether removed.

The oxygen by which the sulphurous-acid gas is converted into sulphuric acid in the chamber D is derived from the atmospheric air admitted by the furnace A, and consequently near the end of the operation this element is so diminished in the chamber D that the deutoxide of nitrogen with difficulty finds oxygen enough to complete the conversion of all the sulphurous into sulphuric acid. By the introduction of the leaden vessel F with with its diaphragm and shielded door a fresh supply of atmospheric air is furnished at a point where the relation between the sulphurous and nitrous gases is such as to secure the oxidation of the whole of the sulphur.

Whatever gases may pass through the chamber or vessel F, and there become mixed with atmospheric air, will be conducted through the pipe G into the ordinary condensing-tower H, where by water (thrown in through a pipe, $i$, and distributed by a pivoted and overbalanced cup, $j$, and by splashing over the firebrick, pumice, or other substance, $k$, therein) they are absorbed and converted into acidulated water. This water, which is, in fact, a weak solution of sulphuric acid, may be taken back by means of the pipe $l$ to the evaporating and cooling tower C, and then thrown over and into the mass of pumice or other material therein by the tilting cups $m$ and $n$. By this means will be recovered whatever acid may be formed after the gases have passed out of the chamber D. This acid will consequently settle in the tower C, whence it may be taken by a trapped pipe or flow, $o$, into the antichamber.

The principal advantages derived from the introduction of these improvements are as follows: First, the life of the chamber is prolonged by avoiding the injury caused by the extreme heat of the gases acting on the lead of which it is composed; second, the heat of the burning sulphur is utilized to supply a part of the steam necessary to the reaction between the acids, thereby to a certain extent taking the place of the steam usually introduced from a detached generator; third, the necessary mixture of the gases with steam is caused to begin at an earlier stage of the process, and the formation of acid sooner sets in; fourth, the weak acid from the condensing-tower H is concentrated in the cooling-tower C to about 45° Baumé before being thrown into the chamber D, thereby avoiding the weakening of the acid in that chamber by the condensation of the steam, and permitting, in consequence, the introduction of a larger quantity of steam into the chamber; fifth, the insuring (by the introduction of a draft of atmospheric air at $g$ in the vessel F) of the oxidation of all the sulphurous-acid gas which may escape oxidation in the chamber; sixth, with these improved arrangements as a whole, one-third more acid can be made in a chamber of a given size, so that two chambers with these arrangements will do the work of three unprovided with them.

Having thus fully described my invention, what I claim therein as new, and desire to secure by Letters Patent, is—

An apparatus for making sulphuric acid constructed and operating substantially as herein described and represented.

ST. JULIEN RAVENEL.

Witnesses:
 A. B. STOUGHTON,
 EDMUND MASSON.